(12) United States Patent
Inoue et al.

(10) Patent No.: US 7,249,533 B2
(45) Date of Patent: Jul. 31, 2007

(54) BALL SCREW DEVICE

(75) Inventors: Masahiro Inoue, Osaka (JP); Isao Usuki, Osaka (JP); Tatsuyuki Miki, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 430 days.

(21) Appl. No.: 10/487,509

(22) PCT Filed: Sep. 4, 2002

(86) PCT No.: PCT/JP02/08973

§ 371 (c)(1),
(2), (4) Date: Feb. 20, 2004

(87) PCT Pub. No.: WO03/029690

PCT Pub. Date: Apr. 10, 2003

(65) Prior Publication Data

US 2004/0200303 A1 Oct. 14, 2004

(30) Foreign Application Priority Data

Sep. 5, 2001 (JP) .............................. 2001-268795

(51) Int. Cl.
*F16H 25/22* (2006.01)
(52) U.S. Cl. .............................. 74/424.85; 74/424.82; 74/424.83
(58) Field of Classification Search ............. 74/424.85, 74/424.82, 424.83, 424.86, 424.88
See application file for complete search history.

(56) References Cited

U.S. PATENT DOCUMENTS

| 2,450,282 | A | * | 9/1948 | Jackson | .................... 74/424.85 |
| 4,070,921 | A |   | 1/1978 | Arnold |  |
| 2003/0051569 | A1 | * | 3/2003 | Kapaan et al. | ........... 74/424.85 |

FOREIGN PATENT DOCUMENTS

| JP | 59-17058 | * | 1/1984 |
| JP | 2000-18360 | * | 1/2000 |

* cited by examiner

*Primary Examiner*—William C Joyce
(74) *Attorney, Agent, or Firm*—Jordan and Hamburg LLP

(57) ABSTRACT

A ball screw device comprises a nut having a thread groove in the inner peripheral surface thereof, a screw shaft having a thread groove in the outer peripheral surface thereof and a plurality of balls interposed between the respective thread grooves. In the screw shaft, the thread groove is of at least substantially one turn. In the screw shaft is provided a ball circulation groove for coupling the downstream and upstream sides of the thread groove so that the balls are returned to the upstream side from the downstream side so as to be thereby circulated.

17 Claims, 6 Drawing Sheets

F I G. 6
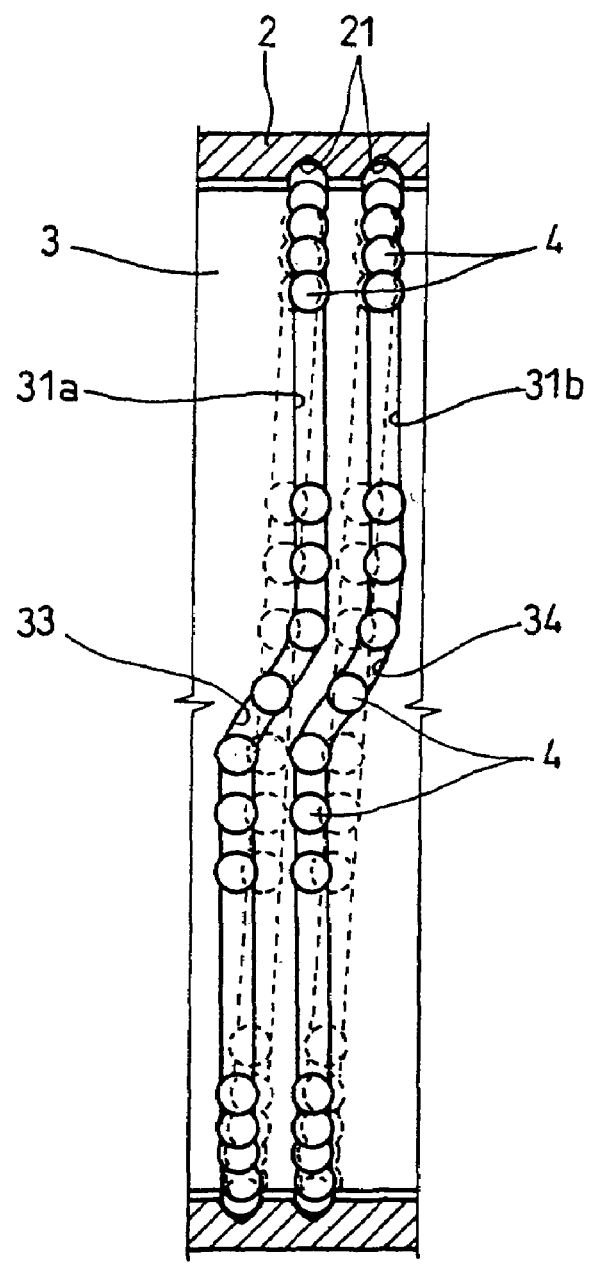

BALL SCREW DEVICE

TECHNICAL FIELD

This invention relates to a ball screw device of ball circulation type.

BACKGROUND TECHNIQUE

A ball screw device comprises a screw shaft having a thread groove in the outer peripheral surface thereof and a nut having a thread groove in the inner peripheral surface thereof and externally mounted on the screw shaft. A plurality of balls are interposed between the respective thread grooves of the screw shaft and the nut. In such a ball screw device, the balls circulate between the respective thread grooves according to the rotational movement of the nut or the screw shaft, which causes a relative telescopic motion between the nut and the screw shaft. In this case, it is necessary, irrespective of the telescopic motion, to provide a structure to prevent the balls from slipping out of between the respective thread grooves. One of such structures is a ball circulation mechanism. The ball circulation mechanism couples both ends of a ball passageway shaped by the respective thread grooves of a screw shaft and a nut to form a closed loop, and thereby circulate the balls in the closed loop. The conventional ball circulation mechanism employs a so-called deflector. The deflector is described below.

The deflector, in general, serves to couple the upstream side of the thread groove, which balls are rolled from, and the downstream side thereof, which the balls are rolled to, so that the balls on the downstream side of the thread grooves are returned to the upstream side thereof over a ridge. The deflector is, being fitted into a radial through hole formed in the nut, fixed to the through hole by an adhesive. The deflector has, in the inner diameter surface thereof, a ball circulation groove of meandering shape for returning the balls from the downstream side, over the ridge, to the upstream side in substantially one turn of the thread grooves.

Such a ball screw device requires an externally mounted part, that is the deflector, which generates additional costs for the deflector, processing the through hole for mounting the deflector in the nut and mounting the deflector to the nut. Besides, when the deflector is mounted to the through hole of the nut rather imprecisely, the ball circulation groove and thread groove cannot be precisely positioned, which results in a degraded circulation performance of the balls. Thus, mounting the deflector requires precision, which is costly.

Therefore, a main object of the present invention is to provide a ball screw device capable of circulating balls without using a deflector.

Another main object of the present invention is to provide a ball screw device capable of circulating balls without using a deflector, and therefore without additional costs.

DISCLOSURE OF THE INVENTION

The ball screw device according to the present invention comprises a nut having a thread groove in the inner peripheral surface thereof, a screw shaft having a thread groove in the outer peripheral surface thereof and a plurality of balls interposed between the respective thread grooves. In the screw shaft is provided at least substantially one turn of the thread groove and a ball circulation groove for coupling the downstream and upstream sides of the thread groove so that the balls are returned from the downstream side to the upstream side to be thereby circulated.

In the case of the ball screw device, the ball circulation groove, instead of a deflector, is provided at a ridge of the screw shaft. Thus, such an externally mounted part as the deflector or the like can be dispensed with, which advantageously results in eliminating working steps such as forming a through hole for fitting the deflector to the nut and mounting the deflector thereto.

In a preferred embodiment of the present invention, in the screw shaft are provided at least two independent thread grooves axially adjacent to one another and each is of substantially one turn, and the ball circulation grooves as many as the plural thread grooves of the screw shaft. The ball circulation grooves separately couple the respective downstream and upstream sides of the corresponding thread grooves of the screw shaft. In this embodiment, the total number of the balls increases, and so does the load capacity accordingly.

In a preferred embodiment of the present invention, the ball circulation grooves sink the balls, which have been rolled to the downstream side of the thread grooves of the screw shaft, to the inner diameter side, thereby leading the balls to travel over the ridge of the nut and reach the upstream side of the thread grooves. In this embodiment, the ball circulation grooves are of meandering shape so that the balls can move smoothly between the thread grooves and the ball circulation grooves.

In a preferred embodiment of the present invention, the ball circulation grooves respectively provided in each of the thread grooves of the screw shaft are disposed in a substantially identical phase and axially adjacent to one another. In this embodiment, wherein the plural ball circulation grooves are disposed in a substantially identical phase and axially adjacent to one another, plural turns of the thread grooves are axially closely spaced, which advantageously reduces an axial area occupied by the thread grooves.

In a preferred embodiment of the present invention, a retainer ring for rotatably retaining each of the balls is mounted on the outer periphery of the screw shaft so as to relatively rotate and in an axially fixed position. This embodiment, wherein the retainer ring for retaining the balls is used, eliminates interference between the balls in the thread grooves, thereby allowing easy relative rotation of the nut and the screw shaft.

BRIEF DESCRIPTION OF THE DRAWINGS

FIG. 6 is a side view schematically showing ball circulation passageways.

BEST MODE FOR EXECUTING THE INVENTION

Figure 1:
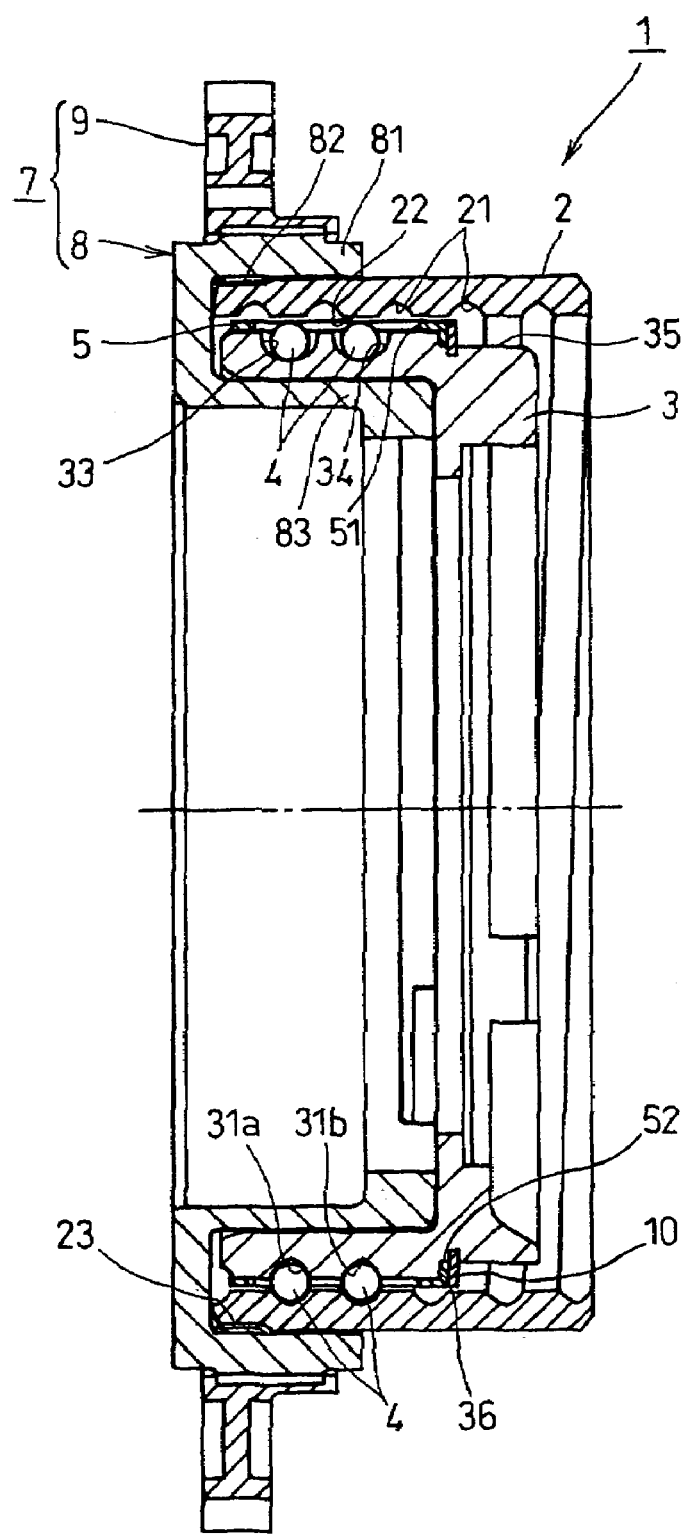
FIG. 1 is a longitudinal sectional view of a ball screw device according to a best mode for executing the present invention.

Referring to FIGS. 1 through 7, a ball screw device according to a best mode for executing the present invention is hereinafter described in detail.

A ball screw device 1 comprises a nut 2, a screw shaft 3, a plurality of balls 4 and a retainer ring 5. The balls 4 are circulated between the opposing surfaces of the nut 2 and the screw shaft 3. In the nut 2 is formed a thread groove 21 continuous from one shaft end to another shaft end. In the axially intermediate region of the screw shaft 3 is formed a plurality of—two in this embodiment—thread grooves 31*a* and 31*b*, which are each of substantially one turn and independent from one another. The thread groove 21 of the nut 2 and the thread grooves 31*a* and 31*b* of the screw shaft 3 are set at an identical lead angle. The thread grooves 21, 31*a* and 31*b* are arranged to be of Gothic arc shape in section, but may be semicircular in section.

The nut 2 and the screw shaft 3 are in a maximally extended state, in which they are separated away from one another with a maximum distance therebetween, so that a region in which they overlap by an axially predetermined length is ensured. The thread grooves 31*a* and 31*b* of the screw shaft 3 are arranged to be disposed in the overlapping region. The thread grooves 31*a* and 31*b* are each arranged to be independent closed loops, and the balls 4, which are disposed in two turns of the thread grooves 31*a* and 31*b* of closed loop, independently roll so as to be thereby circulated.

More specifically, ball circulation grooves 33 and 34 for forming the thread grooves 31*a* and 31*b* separately into the closed loops are provided at a ridge 32 present between the thread grooves 31*a* and 31*b* adjacent to one another in an axial direction of the screw shaft 3. These two ball circulation grooves 33 and 34 separately couple the respective upstream and downstream sides of the thread grooves 31*a* and 31*b*, and each has a meandering shape for sinking the balls 4 on the downstream side of the thread grooves 31*a* and 31*b* to the inner diameter side thereby leading the balls 4 to travel over a ridge 22 of the nut 2 and return to the upstream side.

The retainer ring 5 serves to space the plural balls 4 at circumferentially equal intervals to prevent the balls from interfering with one another and is formed from a thin cylindrical member. At a few points in the circumference of the retainer ring 5 are provided ball pockets 51 elliptically shaped along an axial direction, in each of which two of the balls 4 are housed.

The nut 2 is integrally connected to a gear ring 7. The gear ring 7 has a rotational power source, such as a motor, not shown, or the like engaged thereto via a reduction gear and is supported so as to freely rotate with respect to a support shaft, not shown, inserted through a central hole of the screw shaft 3 via a rolling bearing, not shown. The screw shaft 3 is mounted to a fixed part such as a case, not shown, or the like so as neither to rotate nor axially move. The nut 2 is disposed so as to rotate and axially move with respect to the screw shaft 3.

Figure 5:
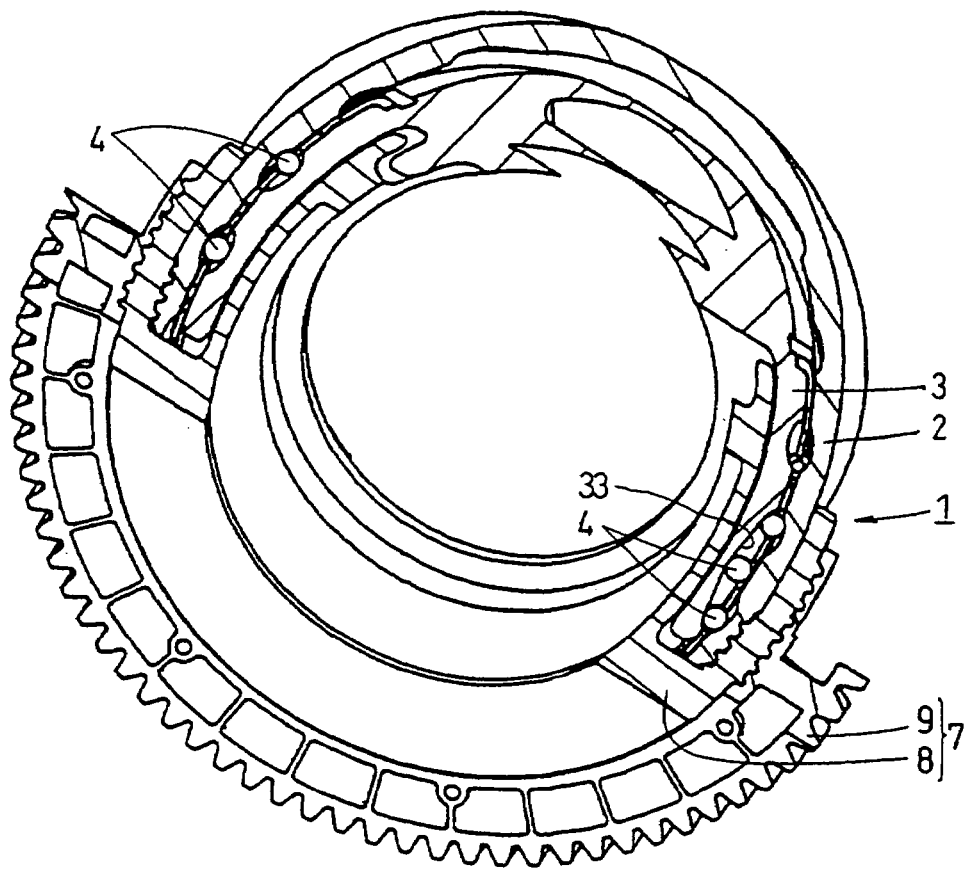
FIG. 5 is a sectional view taken along (5)-(5) line of FIG. 4.

The gear ring 7 comprises an annular body 8 made of metal and having a sectional upper half portion substantially in the shape of a reverse horseshoe and a gear 9 made of resin and integrally formed in the outer peripheral surface of an external cylindrical portion 81 in the annular body 8. The nut 2 is inserted with respect to the inner peripheral surface of the external cylindrical portion 81 in the annular body 8 of the gear ring 7. As shown in FIG. 5, a serration 82 provided in the inner peripheral surface of the external cylindrical portion 81 on the base side thereof and a serration 23 provided in the outer peripheral surface of the nut 2 on the back side in the insertion direction thereof are engaged with each other to thereby connect the gear ring 7 and the nut 2 in a relatively non-rotatable manner. The foregoing rolling bearing, not shown, is fitted to the inner peripheral surface of an internal cylindrical portion 83 in the annular body 8 of the gear ring 7.

The retainer ring 5 is mounted on the screw shaft 3 so as to be substantially axially immovable and relatively rotatable. For that reason, a reduced diameter portion 35 and a radially inward flange 52 are provided respectively on the free end side of the screw shaft 3 and on one end of the retainer ring 5. The flange 52 of the retainer ring 5 is fitted to the reduced diameter portion 35 of the screw shaft 3. A snap ring 10 is engaged with a peripheral groove provided on the reduced diameter portion 35 of the screw shaft 3. However, the snap ring 10 is mounted at a position distant from a step wall surface 36 formed on the border of the reduced diameter portion 35 of the screw shaft 3 and the portion where the thread groove 21 is formed. The flange 52 of the retainer ring 5 is disposed, with a slight axial play, between the snap ring 10 and the step wall surface 36. Accordingly, the retainer ring 5 is substantially axially immovable with respect to the screw shaft 3 but relatively rotatable.

The assembling steps of the ball screw device 1 are hereinafter described.

First, the retainer ring 5 is mounted on the screw shaft 3, and then the ball pockets 51 of the retainer ring 5 are coated with grease to the extent of being thereby infilled. A required number of the balls 4 are placed in the ball pockets 51. The grease used here has enough viscosity to prevent the balls 4 from falling by their own weight and serves to retain the balls 4 inside the ball pockets 51. When the foregoing steps have been done, the retainer ring 5, which been arranged not to rotate with respect to the screw shaft 3, is incorporated in the nut 2.

The operation of the foregoing ball screw device 1 is hereinafter described.

Figure 2:
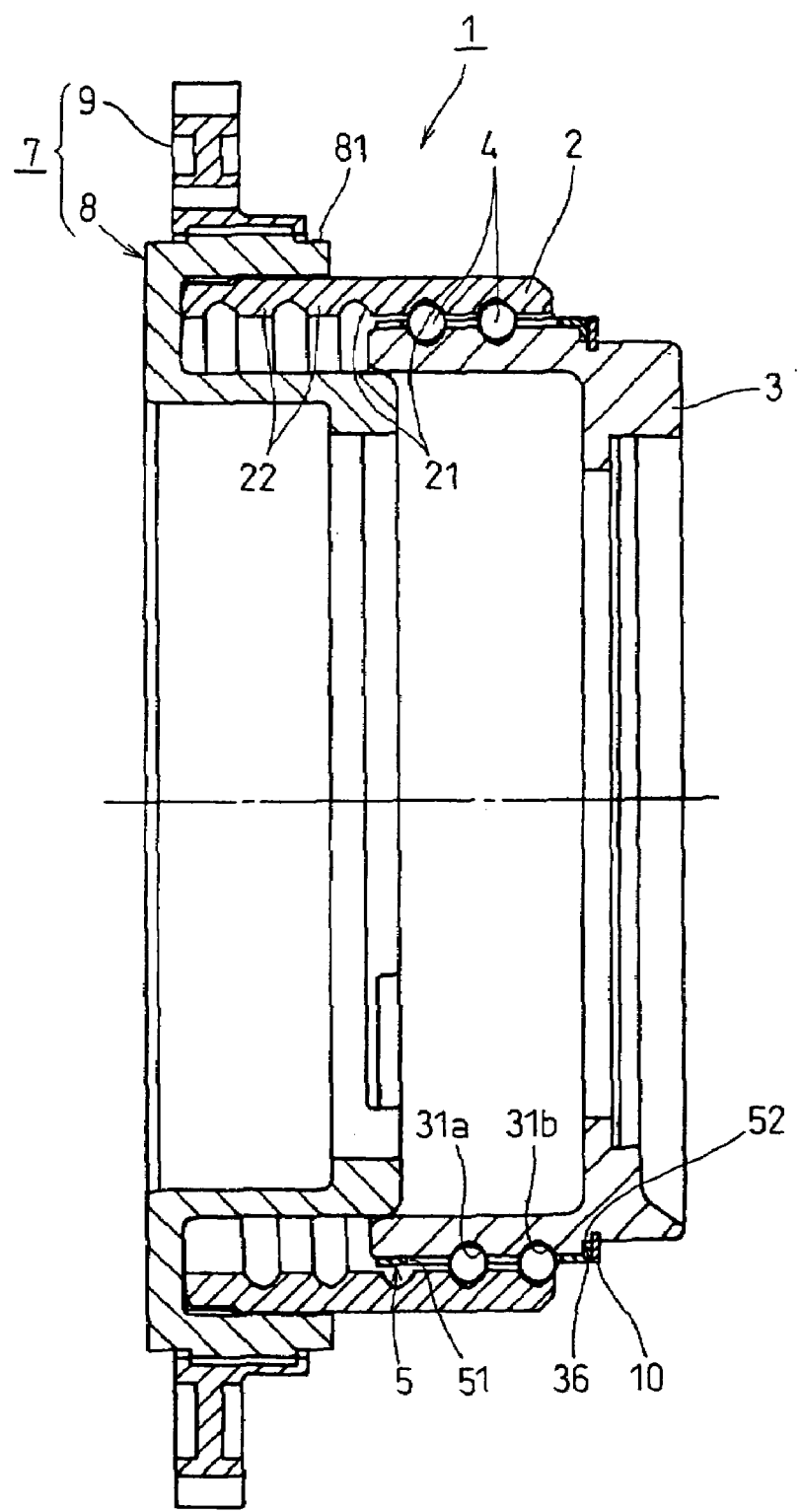
FIG. 2 is a longitudinal sectional view of the nut shown in FIG. 1 having been moved in one axial direction.
Figure 3:
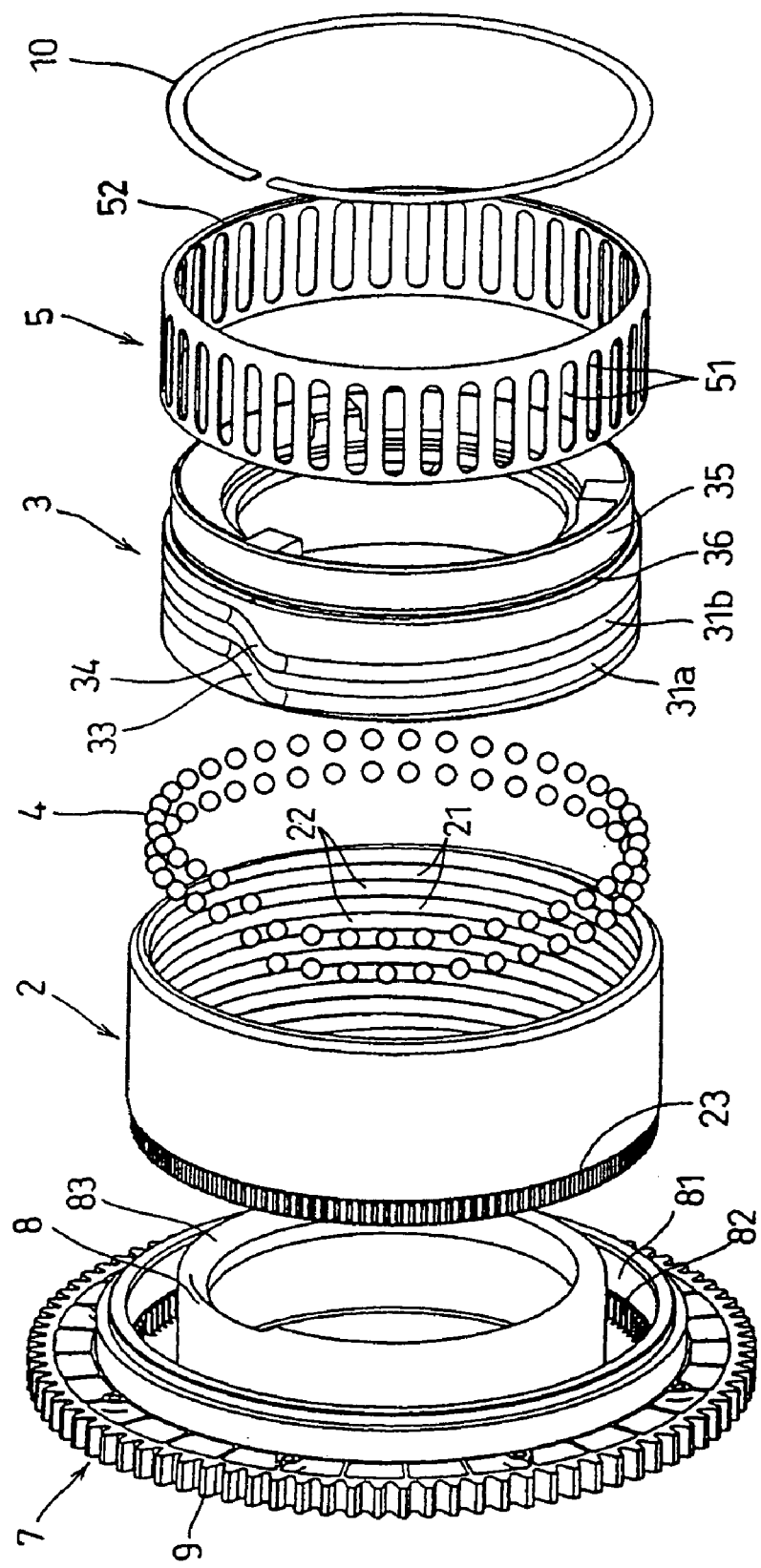
FIG. 3 is a perspective view of a disassembled ball screw device.
Figure 4:
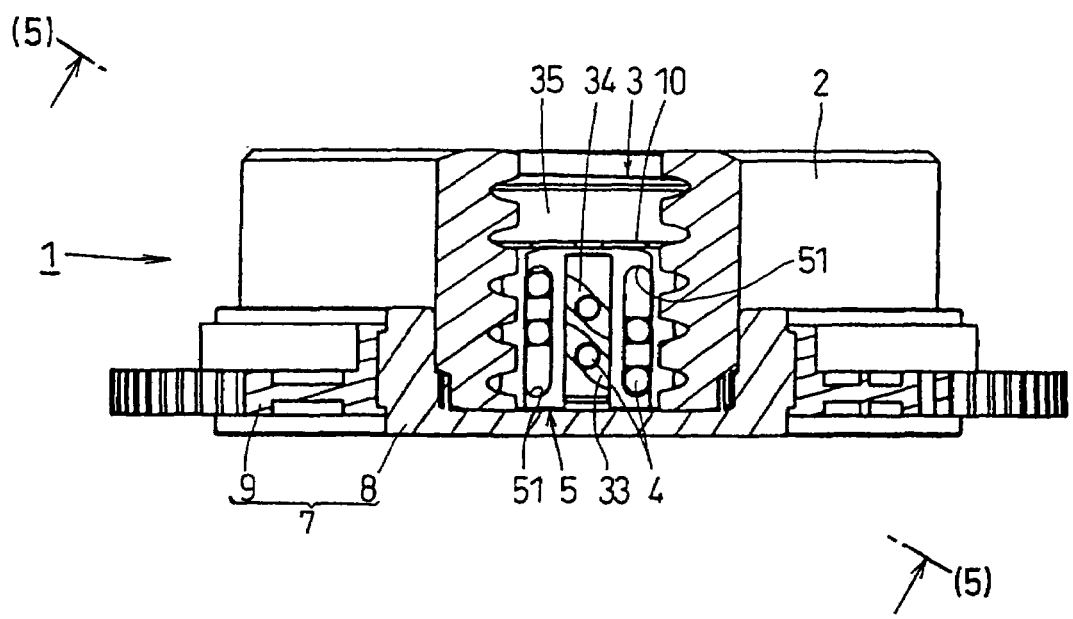
FIG. 4 is a plan view of a part of a ball screw device shown in section.

When the gear ring 7 and the nut 2 are rotated by driving a motor, not shown, in one direction, the nut 2 itself is, being rotated, guided by the screw shaft 3 to be thereby linearly moved in one axial direction so that, for example, the state shown in FIG. 1 is shifted to the state shown in FIG. 2. When the motor is driven in the opposite direction, the nut 2 is, being rotated in the opposite direction as well, moved in the opposite axial direction so that, for example, the state shown in FIG. 2 is shifted to the state shown in FIG. 1.

Thus, when the nut 2 is axially reciprocated, an axially overlapping region of the nut 2 and the screw shaft 3 increases or decreases. The balls 4 are guided by the retainer ring 5 so as to roll and thereby circulate respectively in the thread grooves 31*a* and 31*b* of the screw shaft 3, which are formed into independent closed loops by the ball circulation grooves 33 and 34, so that spiral movement of the nut 2 is smoothly guided, while the balls 4 are unfailingly prevented from slipping out when the nut 2 reciprocates in a predetermined stroke.

As described, the embodiment of the present invention has such a structure as follows: the thread grooves 31*a* and 31*b* axially adjacent to one another in the screw shaft 3 are formed into independent closed loops; the balls 4 are rolled and thereby circulated in the closed loops; and two ball circulation grooves 33 and 34, instead of the conventional deflector, are provided at the ridge 32 of the screw shaft 3. Therefore, in this embodiment, the number of parts to be used can be reduced compared to the conventional products, which advantageously saves such labor as forming a through hole for fitting the deflector to the nut 2 and mounting the deflector thereto. As a result of that, in this embodiment, manufacturing cost can be reduced compared to the use of the deflector. Further, in this embodiment, it is unnecessary, contrary to the conventional products, to adjust the positioning of the deflector with respect to the ball circulation grooves and the thread grooves, clearing the possibility of any inferior quality caused by such a deviated positioning in case it occurs by any chance.

Figure 7:
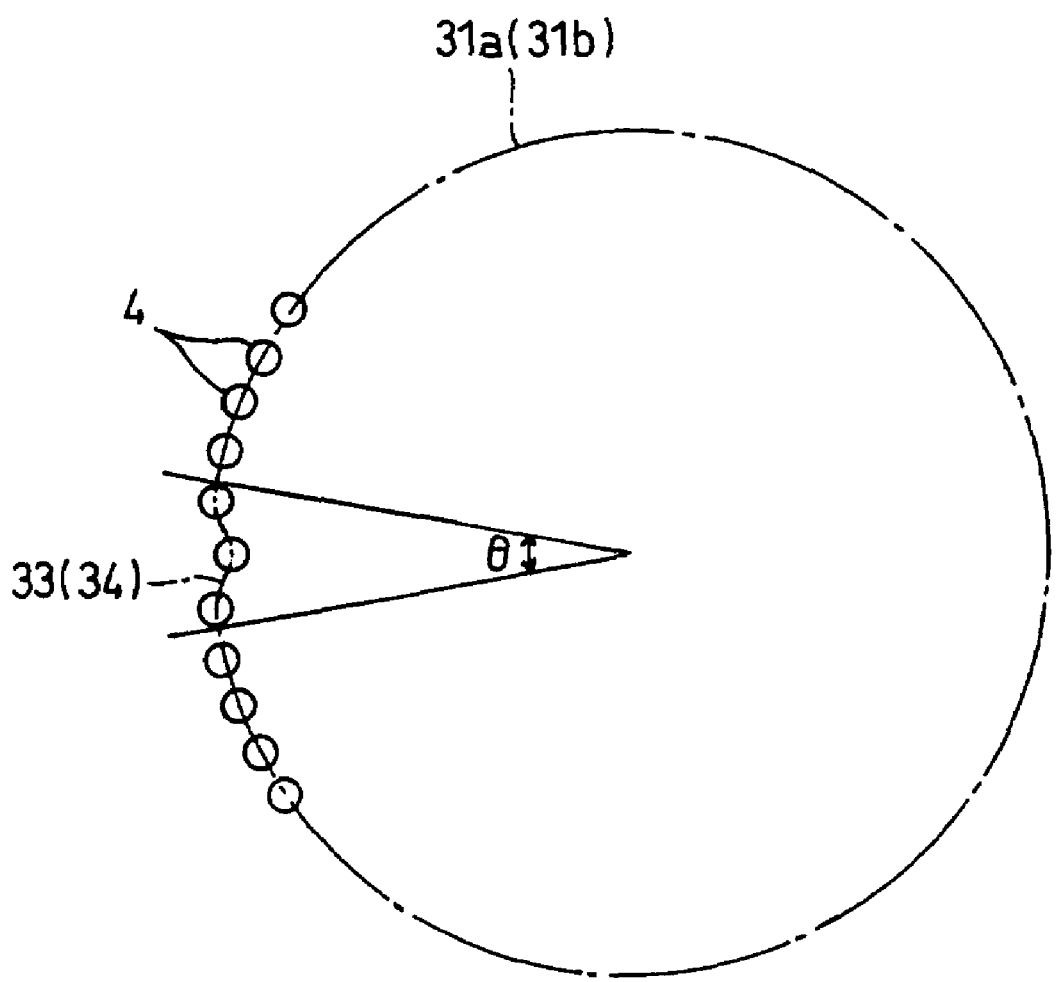
FIG. 7 is a front view of the ball circulation passageways of FIG. 6.

As described earlier, when two ball circulation grooves 33 and 34 are provided in a substantially identical phase and axially adjacent to one another, as shown in FIG. 6, so that the thread grooves 31a and 31b of the screw shaft 3 can be axially closely spaced so as to advantageously reduce an area which is thereby axially occupied. However, in this case, the balls 4 disposed in the ball circulation grooves 33 and 34 can be subject to neither a radial load nor an axial load, and therefore providing two ball circulation grooves 33 and 34 circumferentially and axially in the vicinity will create a non-load bearing area in a predetermined angle on the circumference of the thread grooves 31a and 31b. However, by shortening the axial dimensions of the nut 2 and the screw shaft 3 and setting the outer diameters thereof at a larger value in accordance with the foregoing embodiment, a region in an angle θ, which is covered by the ball circulation grooves 33 and 34 on the circumference of the thread grooves 31a and 31b, can be smaller, as shown in FIG. 7, and a smaller number of the balls 4 is required to be disposed in the ball circulation grooves 33 and 34. Accordingly, the decrease of load bearing performance can be controlled so as to eliminate possible trouble in practical use.

The present invention is not limited to the described embodiment of the invention, and different applications and modifications are possible options.

For example, the ball screw device 1 may be used in such manner that one of the nut 2 and the screw shaft 3 is rotated to axially move the other, that is a first mode of use, or in such manner that one of the nut 2 and the screw shaft 3 is axially moved to rotate the other, that is a second mode of use. The first mode of use is referred to as a forward efficiency for converting a torque into a thrust and four examples thereof follow. The second mode of use is referred as a reverse efficiency for converting a thrust into a torque and four examples thereof follow.

1. A First Mode of Use

① As described heretofore, the nut 2 is, being rotated, axially moved. In this case, the screw shaft 3 is arranged to be non-rotatable and axially immovable to have the nut 2 rotate.

② The nut 2 is, without being rotated, axially moved. In this case, the screw shaft 3 is arranged to be axially immovable, while the nut 2 is arranged to be non-rotatable to have the screw shaft 3 rotate.

③ The screw shaft 3 can be, being rotated, axially moved. In this case, the nut 2 is arranged to be non-rotatable and axially immovable to have the screw shaft 3 rotate.

④ The screw shaft 3 is, without being rotated, axially moved. In this case, the screw shaft 3 is arranged to be non-rotatable, while the nut 2 is arranged to be axially immovable and rotate.

2. A Second Mode of Use

① The nut 2 is axially immovably rotated. In this case, the nut 2 is arranged to be axially immovable, while the screw shaft 3 is arranged to be non-rotatable and axially moved.

② The nut 2 is, being axially moved, rotated. In this case, the screw shaft 3 is arranged to be axially immovable and non-rotatable to have the nut 2 axially move.

③ The screw shaft 3 is axially immovably rotated. In this case, the screw shaft 3 is arranged to be axially immovable, while the nut 2 is arranged to be non-rotatable and axially moved.

④ The screw shaft 3 is, being axially moved, rotated. In this case, the nut 2 is arranged to be axially immovable and non-rotatable to have the screw shaft 3 axially move.

INDUSTRIAL APPLICABILITY

The present invention can be applied to a method of converting a rotational movement into a linear movement and vise versa in machine tools, semiconductor devices, precision position tables, robots and conveying equipment.

What is claimed is:

1. A ball screw device comprising:
a nut having a nut thread groove in an inner peripheral surface thereof defining a ridge in the inner peripheral surface;
a screw shaft having an outer peripheral surface and a plurality of screw shaft thread grooves each formed in a continuous first helical direction in the outer peripheral surface and axially adjacent to one another, each of said screw shaft thread grooves having an upstream end and a downstream end;
a plurality of balls interposed between the screw shaft thread grooves and the nut thread groove;
said screw shall having ball circulation grooves each adjoining and coupling the downstream end of one of the screw shaft thread grooves and the upstream end of the one of the screw shaft thread grooves so that the balls are returned to the upstream end from the downstream end so as to be thereby circulated, the ball circulation grooves being formed in the outer peripheral surface of the screw shaft and substantially in a common angular segment of the screw shaft defined by the upstream ends and the downstream ends of the screw shaft thread grooves, and the ball circulation grooves being axially adjacent to one another; and
a retainer ring for rotatably retaining each of the balls in circumferentially spaced positions around a circumference of said screw shaft, said retainer ring being mounted to an outer periphery of the screw shaft so as to rotate relative said screw shaft and remain in an axially fixed position relative said screw shaft.

2. The ball screw device as claimed in claim 1, wherein the plurality of screw shaft thread grooves are each of substantially one turn.

3. The ball screw device as claimed in claim 1, wherein the ball circulation grooves radially inwardly sink the balls rolled to the downstream ends of the screw shaft thread grooves of the screw shaft and direct the balls to travel over ridge of the nut and reach the upstream ends of the screw shaft thread grooves.

4. The ball screw device of claim 1 wherein the retainer ring retains each of the balls such that the halls in respective ones of the screw shaft grooves are angularly positioned relative the respective ones of the screw shaft grooves and the ball circulation grooves at positions common to corresponding other ones of the balls in other ones of the screw shaft grooves such that the corresponding balls move in like phase positions through respective ones of the screw shaft grooves to undergo like simultaneous motion in the screw shaft grooves and the ball circulation grooves.

5. The ball screw device of claim 4 wherein the retainer defines axially extending slots within which the balls are retained circumferentially separated from each other.

6. The ball screw device of claim 5 wherein the axially extending slots individually retain a first ball situated a first shaft thread groove of said plurality of screw shaft thread grooves and a second ball situated in a second screw shaft thread groove of said plurality of screw shaft thread grooves, said first and second balls being of said balls interposed between the screw shaft thread grooves arid the nut thread groove and being said corresponding balls that move in like phase positions.

7. The ball screw device of claim 6 wherein the outer periphery of the screw shaft, to which the retainer is mounted, includes a circumferential step face and a circumferential groove spaced from said circumferential step face and a snap ring disposed in the circumferential groove, and said retainer includes a radially inwardly extending portion disposed between said circumferential step face and said snap ring so as to fixedly axially position said retainer relative to said screw shaft and allow the retainer to rotate relative said screw shaft.

8. The ball screw device as claimed in claim 7, wherein the plurality of screw shaft thread grooves are each of substantially nearly one turn.

9. The ball screw device as claimed in claim 8, wherein the ball circulation grooves radially inwardly sink the balls rolled to the downstream ends of the screw shaft thread grooves of the screw shaft and direct the balls to travel over the ridge of the nut and reach the upstream ends of the screw shaft thread grooves.

10. The ball screw device of claim 1 wherein the retainer defines slots within which the balls are retained circumferentially separated from each other.

11. The ball screw device of claim 10 wherein the slots individually retain a first ball situated a first shaft thread groove of said plurality of screw shaft thread grooves and a second ball situated in a second screw shaft thread groove of said plurality of screw shaft thread grooves, said first and second balls being of said balls interposed between the screw shaft thread grooves and the nut thread groove.

12. The ball screw device of claim 11 wherein the outer periphery of the screw shaft, to which the retainer is mounted, includes a circumferential step face and a circumferential groove spaced from said circumferential step face and a snap ring disposed in the circumferential groove, and said retainer includes a radially inwardly extending portion disposed between said circumferential step face and said snap ring so as to fixedly axially position said retainer relative to said screw shaft and allow the retainer to route relative said screw shaft.

13. The ball screw device as claimed in claim 12, wherein the plurality of screw shaft thread grooves are each of substantially nearly one turn.

14. The ball screw device as claimed in claim 13, wherein the ball circulation grooves radially inwardly sink the balls rolled to the downstream ends of the screw shaft thread grooves of the screw shaft and direct the balls to travel over the ridge of the nut and reach the upstream ends of the screw shaft thread grooves.

15. The ball screw device of claim 1 wherein the outer periphery of the screw shaft, to which the retainer is mounted, includes a circumferential step face and a circumferential groove spaced from said circumferential step face and a snap ring disposed in the circumferential groove, and said retainer includes a radially inwardly extending portion disposed between said circumferential step face and said snap ring so as to fixedly axially position said retainer relative to said screw shaft and allow the retainer to rotate relative said screw shaft.

16. The ball screw device as claimed in claim 15, wherein the plurality of screw shaft thread grooves arc each of substantially nearly one turn.

17. The ball screw device as claimed in claim 16, wherein the ball circulation grooves radially inwardly sink the balls rolled to the downstream ends of the screw shalt thread grooves of the screw shaft and direct the balls to travel over the ridge of the nut and reach the upstream ends of the screw shaft thread grooves.

* * * * *